United States Patent
Shim et al.

(10) Patent No.: US 11,878,945 B2
(45) Date of Patent: Jan. 23, 2024

(54) APPLYING SILICON METAL-CONTAINING BOND LAYER TO CERAMIC OR CERAMIC MATRIX COMPOSITE SUBSTRATES

(71) Applicants: Rolls-Royce Corporation, Indianapolis, IN (US); Rolls-Royce High Temperature Composites, Inc., Cypress, CA (US)

(72) Inventors: Sungbo Shim, Irvine, CA (US); Kang N. Lee, Avon, OH (US); Stephen Isaiah Harris, Long Beach, CA (US); Andrew Joseph Lazur, Laguna Beach, CA (US)

(73) Assignees: Rolls-Royce Corporation, Indianapolis, IN (US); Rolls-Royce High Temperature Composites, Inc., Cypress, CA (US)

( * ) Notice: Subject to any disclaimer, the term of this patent is extended or adjusted under 35 U.S.C. 154(b) by 662 days.

(21) Appl. No.: 17/166,273

(22) Filed: Feb. 3, 2021

(65) Prior Publication Data
US 2021/0403389 A1    Dec. 30, 2021

Related U.S. Application Data

(62) Division of application No. 15/261,394, filed on Sep. 9, 2016, now Pat. No. 10,941,079.
(Continued)

(51) Int. Cl.
*B32B 15/04* (2006.01)
*B32B 17/06* (2006.01)
(Continued)

(52) U.S. Cl.
CPC .......... *C04B 37/006* (2013.01); *C04B 41/009* (2013.01); *C04B 41/4539* (2013.01);
(Continued)

(58) Field of Classification Search
CPC ..................................................... C04B 37/006
(Continued)

(56) References Cited

U.S. PATENT DOCUMENTS 5,759,640 A    6/1998    Mannava et al.
6,645,560 B2    11/2003    Zhao et al.
(Continued)

FOREIGN PATENT DOCUMENTS

EP    0619856 B1    11/1999
EP    3026035 A1    6/2016

OTHER PUBLICATIONS

Office Action from counterpart Canadian Application No. 2,941,593 dated May 19, 2022, 4 pp.
(Continued)

*Primary Examiner* — Lauren R Colgan
(74) *Attorney, Agent, or Firm* — Shumaker & Sieffert, P.A.

(57) ABSTRACT

In some examples, a method may include depositing, from a slurry comprising particles including silicon metal, a bond coat precursor layer including the particles comprising silicon metal directly on a ceramic matrix composite substrate. The method also may include locally heating the bond coat precursor layer to form a bond coat comprising silicon metal. Additionally, the method may include forming a protective coating on the bond coat. In some examples, an article may include a ceramic matrix composite substrate, a bond coat directly on the substrate, and a protective coating on the bond coat. The bond coat may include silicon metal and a metal comprising at least one of Zr, Y, Yb, Hf, Ti, Al, Cr, Mo, Nb, Ta, or a rare earth metal.

17 Claims, 4 Drawing Sheets

Related U.S. Application Data (60) Provisional application No. 62/216,833, filed on Sep. 10, 2015.

(51) Int. Cl.

| | | |
|---|---|---|
| *C04B 37/00* | (2006.01) | |
| *C23C 28/00* | (2006.01) | |
| *F01D 5/28* | (2006.01) | |
| *C04B 41/89* | (2006.01) | |
| *C23C 20/04* | (2006.01) | |
| *C04B 41/00* | (2006.01) | |
| *C04B 41/85* | (2006.01) | |
| *C04B 41/45* | (2006.01) | |
| *C04B 41/50* | (2006.01) | |
| *C04B 41/52* | (2006.01) | |

(52) U.S. Cl.
CPC ...... *C04B 41/4543* (2013.01); *C04B 41/5027* (2013.01); *C04B 41/5096* (2013.01); *C04B 41/52* (2013.01); *C04B 41/85* (2013.01); *C04B 41/89* (2013.01); *C23C 20/04* (2013.01); *C23C 28/324* (2013.01); *C23C 28/3455* (2013.01); *F01D 5/282* (2013.01); *F01D 5/284* (2013.01); *F01D 5/288* (2013.01); *C04B 2237/16* (2013.01); *C04B 2237/34* (2013.01); *C04B 2237/365* (2013.01); *F05D 2230/40* (2013.01); *F05D 2300/15* (2013.01); *F05D 2300/6033* (2013.01); *F05D 2300/701* (2013.01)

(58) Field of Classification Search
USPC .......................................................... 428/698
See application file for complete search history.

(56) References Cited

U.S. PATENT DOCUMENTS

| | | |
|---|---|---|
| 7,060,360 B2 | 6/2006 | Eaton |
| 7,374,818 B2 | 5/2008 | Bhatia et al. |
| 8,673,400 B2 | 3/2014 | Kirby et al. |
| 8,729,161 B2 | 5/2014 | Kirby et al. |
| 9,005,716 B2 | 4/2015 | Kirby et al. |
| 9,023,435 B2 | 5/2015 | Kirby et al. |
| 2005/0238888 A1 | 10/2005 | Spitsberg et al. |
| 2009/0162556 A1 | 6/2009 | Boutwell et al. |
| 2009/0162632 A1 | 6/2009 | Kirby et al. |
| 2010/0159151 A1 | 6/2010 | Kirby et al. |
| 2010/0255260 A1 | 10/2010 | Lee et al. |
| 2010/0330282 A1 | 12/2010 | Nienburg et al. |
| 2011/0027467 A1 | 2/2011 | Kirby et al. |
| 2011/0027469 A1 | 2/2011 | Kirby et al. |
| 2011/0027470 A1 | 2/2011 | Kirby et al. |
| 2011/0027476 A1 | 2/2011 | Kirby et al. |
| 2011/0027484 A1 | 2/2011 | Kirby et al. |
| 2011/0027517 A1 | 2/2011 | Kirby et al. |
| 2011/0027557 A1 | 2/2011 | Kirby et al. |
| 2011/0027558 A1 | 2/2011 | Kirby et al. |
| 2011/0027559 A1 | 2/2011 | Kirby et al. |
| 2011/0027578 A1 | 2/2011 | Kirby et al. |
| 2013/0209745 A1 | 8/2013 | Legoux et al. |
| 2017/0073277 A1 | 3/2017 | Shim et al. |

OTHER PUBLICATIONS

Extended Search Report from counterpart European Application No. 16186627.2, dated Jan. 25, 2017, 5 pp.

Response to Search Report dated Jan. 25, 2017, and to Communication pursuant to Rule 69 EPC and Rule 70a(1) EPC dated Mar. 20, 2017, from counterpart European Application No. 16186627.2, filed Jul. 18, 2017, 1 pp.

Intent to Grant dated Nov. 9, 2017, from counterpart European Application No. 16186627.2, 8 pp.

Luthra_Melt Infiltrated (MI) SiC/SiC Composites for Gas Turbine Applications, DER Peer Review for Microturbine & Industrial Gas Turbines Programs, Mar. 14, 2002, p. 1-23.

Prosecution History from U.S. Appl. No. 13/645,675, dated Oct. 4, 2018 through Nov. 9, 2020, 86 pp.

Office Action from counterpart Canadian Application No. 2,941,593 dated Feb. 6, 2023, 3 pp.

Response to Office Action dated May 19, 2022, from counterpart Canadian Application No. 2,941,593 filed Sep. 16, 2022, 15 pp.

APPLYING SILICON METAL-CONTAINING BOND LAYER TO CERAMIC OR CERAMIC MATRIX COMPOSITE SUBSTRATES

This application is a divisional application of U.S. application Ser. No. 15/261,394, filed Sep. 9, 2016, which claims priority to and the benefit of U.S. Provisional Application No. 62/216,833 filed Sep. 10, 2015. The entire contents of each U.S. application listed above are incorporated herein by reference.

TECHNICAL FIELD

The disclosure relates to coatings for ceramic or ceramic matrix composite substrates.

BACKGROUND

Components of high-temperature mechanical systems, such as, for example, gas-turbine engines, operate in severe environments. For example, the high-pressure turbine blades, vanes, blade tracks and blade shrouds exposed to hot gases in commercial aeronautical engines may experience metal surface temperatures of about 1000° C., with short-term peaks as high as 1100° C.

Components of high-temperature mechanical systems may include a Ni— or Co-based superalloy substrate, a ceramic substrate, or a ceramic matrix composite (CMC) substrate. Some ceramics or CMCs possess excellent high temperature mechanical, physical and chemical properties, and may allow gas turbine engines to operate at higher temperatures than gas turbine engines having superalloy components.

SUMMARY

In some examples, a method may include depositing, from a slurry comprising particles including silicon metal, a bond coat precursor layer including the particles comprising silicon metal directly on a ceramic matrix composite substrate. The method also may include locally heating the bond coat precursor layer to form a bond coat comprising silicon metal. Additionally, the method may include forming a protective coating on the bond coat.

In some examples, an article may include a ceramic matrix composite substrate, a bond coat directly on the substrate, and a protective coating on the bond coat. The bond coat may include silicon metal and a metal comprising at least one of Zr, Y, Yb, Hf, Ti, Al, Cr, Mo, Nb, Ta, or a rare earth metal.

The details of one or more examples are set forth in the accompanying drawings and the description below. Other features, objects, and advantages will be apparent from the description and drawings, and from the claims.

DETAILED DESCRIPTION

The disclosure describes an article including a substrate and a coating that includes a bond coat including silicon metal and a protective coating on the bond coat. The bond coat may increase adhesion between the substrate and the protective coating. The disclosure also describes techniques for depositing the bond coat from a slurry including silicon metal particles. In some examples, a bond coat precursor layer may be deposited from the slurry, and the bond coat precursor layer may be locally heated. For example, a tungsten inert gas welding (TIG welding) energy beam or a laser may be used to locally heat the bond coat precursor layer. By locally heating the bond coat precursor layer, heating of the substrate may be reduced, which may reduce a likelihood of damage to the substrate during the coating application process, e.g., compared to thermal spraying techniques, vapor deposition techniques, or the like.

In some examples, the bond coat may include an additive metal that acts as a melting point depressant, such as at least one of zirconium metal, yttrium metal, titanium metal, aluminum metal, chromium metal, niobium metal, tantalum metal, or a rare earth metal. The melting point depressant may reduce a melting temperature of the bond coat precursor layer, which may facilitate melting of the bond coat precursor layer to form the bond coat with less heat, and thus less heating of the underlying substrate. In some examples, the bond coat additionally or alternatively may include an additive metal that enhances oxidation, such as molybdenum metal, hafnium metal, or ytterbium metal. The oxidation enhancement additive may facilitate oxidation of the bond coat to form an oxide scale, which may increase adhesion between the bond coat and the protective layer.

In some examples, the protective layer also may be formed on the bond coat using a slurry deposition technique. In other examples, the protective layer may be formed on the bond coat using another deposition technique, such as a thermal spraying technique, a vapor deposition technique, or the like.

In some examples, the protective layer may include an environmental barrier coating layer. The environmental barrier coating layer may include, for example, a base material, a first additive, and a second additive. The first additive may include silicon metal, which may increase adhesion to the bond coat. The second additive may include a material that reacts with the another constituent of the environmental barrier coating to form at least one phase that has a lower melting point. This lower melting point phase may promote formation of a denser environmental barrier coating by filling gaps or pores during heating of the environmental barrier coating.

Figure 1:
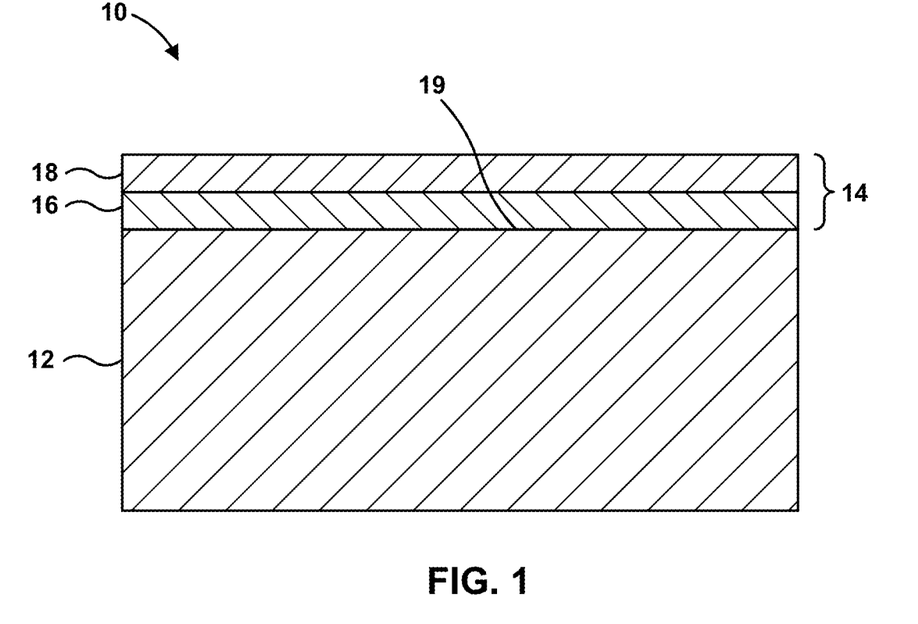
FIG. 1 is a conceptual and schematic diagram illustrating an example article including a substrate and a coating, which includes a bond coat and a protective coating.

FIG. 1 is a conceptual and schematic diagram illustrating an example article 10 including a substrate 12 and a coating 14, which includes a bond coat 16 and a protective coating 18. Bond coat 16 may include silicon metal and may be formed using slurry deposition of a bond coat precursor layer followed by localized heating of the bond coat precursor layer to form bond layer 16.

Substrate 12 may be a component of a high temperature mechanical system. For example, substrate 12 may be a blade track, an airfoil, a blade, vane, a combustion chamber liner, or the like. In some examples, substrate 12 include a ceramic, a ceramic matrix composite (CMC), or a metal alloy that includes Si. In some examples, substrate 12 may include a silicon based material, such as silicon based ceramic, a silicon based CMC, or a silicon based alloy.

In some examples in which substrate 12 includes a ceramic, the ceramic may be substantially homogeneous. In some examples, a substrate 12 that includes a ceramic includes, for example, a Si-containing ceramic, such as $SiO_2$, silicon carbide (SiC) or silicon nitride ($Si_3N_4$); $Al_2O_3$; aluminosilicate (e.g., $Al_2SiO_5$); or the like. In other examples, substrate 10 includes a metal alloy that includes Si, such as a molybdenum-silicon alloy (e.g., $MoSi_2$) or a niobium-silicon alloy (e.g., $NbSi_2$).

In examples in which substrate 12 includes a CMC, substrate 12 includes a matrix material and a reinforcement material. The matrix material includes a ceramic material, such as, for example, SiC, $Si_3N_4$, $Al_2O_3$, aluminosilicate, $SiO_2$, or the like. The CMC further includes a continuous or discontinuous reinforcement material. For example, the reinforcement material may include discontinuous whiskers, platelets, or particulates. As other examples, the reinforcement material may include a continuous monofilament or multifilament weave. In some examples, the reinforcement material may include SiC, $Si_3N_4$, $Al_2O_3$, aluminosilicate, $SiO_2$, or the like. In some examples, substrate 12 includes a melt-infiltrated SiC—SiC CMC, in which a fibrous preform including SiC fibers is impregnated with SiC particles from a slurry, then melt infiltrated with silicon metal or a silicon alloy to form the melt-infiltrated SiC—SiC CMC.

Substrate 12 defines a surface 19 on which coating 14 is disposed. In the example illustrated in FIG. 1, coating 14 includes a bond coat 16 and a protective coating 18. In some examples, coating 14 may be on all of surface 19 of substrate 12. In other examples, coating 14 may be on only a part of surface 19 of substrate 12. For example, coating 14 may be on a portion of substrate 12 that is exposed to a flow path of hot gases in a gas turbine engine. In other examples, coating 14 may be on non-gas flow path areas, such as a backside of a seal segment or a blade dovetail region.

Bond coat 16 is between substrate 12 and protective coating 18. Bond coat 16 includes silicon metal, and may optionally include at least one additive. The optional at least one additive may include, for example, at least one of SiC, a melting point depressant, or an oxidation enhancer.

SiC may affect the properties of bond coat 16. For example, SiC particles may modify oxidation resistance of bond coat 16, modify chemical resistance of bond coat 16, influence the CTE of bond coat 16, or the like. In some examples, bond coat 16 may include between about 1 vol. % and about 40 vol. % SiC, such as between about 1 vol. % and about 20 vol. % SiC, or between about 5 vol. % and about 40 vol. % SiC, or between about 5 vol. % and about 20 vol. % SiC.

In examples in which bond coat 16 includes a melting point depressant, the melting point depressant may include a metal or alloy, such as at least one of zirconium metal, yttrium metal, titanium metal, aluminum metal, chromium metal, niobium metal, tantalum metal, or a rare earth metal. Rare earth metals include scandium, yttrium, lanthanum, cerium, praseodymium, neodymium, promethium, samarium, europium, gadolinium, terbium, dysprosium, holmium, erbium, thulium, ytterbium, and lutetium. In some examples in which bond coat 16 includes a melting point depressant, bond coat 16 may include greater than 0 wt. % and less than about 30 wt. % of the melting point depressant, such as greater than 0 wt. % and less than about 10 wt. % of the melting point depressant. In some examples, bond coat 16 may include at least two melting point depressants, and bond coat 16 may include greater than 0 wt. % and less than about 30 wt. % of each of the at least two melting point depressants, 0 wt. % and less than about 10 wt. % of each of the at least two melting point depressants.

The melting point depressant may reduce a melting point of a precursor of bond coat 16 that is formed as part of the technique for forming bond coat 16. This may allow melting of the precursor at lower temperatures, which may reduce a chance that the melting of the precursor to form bond coat 16 damages substrate 12.

In examples in which bond coat 16 includes an oxidation enhancer, the oxidation enhancer may include at least one of molybdenum, hafnium, or ytterbium. In some examples in which bond coat 16 includes an oxidation enhancer, bond coat 16 may include greater than 0 wt. % and less than about 10 wt. % of the oxidation enhancer. In some examples, bond coat 16 may include at least two oxidation enhancer, and bond coat 16 may include greater than 0 wt. % and less than about 10 wt. % of each of the at least two oxidation enhancer. The oxidation enhancer may facilitate formation of a stable oxide scale on a surface of bond coat 16, which may increase adhesion between bond coat 16 and protective coating 18, reduce diffusion of elements through bond coat 16, or both.

Bond coat 16 may define any suitable thickness, measured in a direction substantially normal to surface 19 of substrate 12. In some examples, bond coat 16 defines a thickness of between about 0.5 mils (about 12.7 micrometers) and about 40 mils (about 1016 micrometers), such as between about 1 mils (about 25.4 micrometers) and about 10 mils (about 254 micrometers).

Protective coating 18 may include, for example, an environmental barrier coating (EBC), a thermal barrier coating (TBC), a calcia-magnesia-aluminosilicate (CMAS)-resistant layer, and abradable coating, or the like. In some examples, a single protective coating 18 may perform two or more of these functions. For example, an EBC may provide environmental protection, thermal protection, and CMAS-resistance to substrate 12. In some examples, instead of including a single protective coating 18, article 10 may include a plurality of overlying layers, such as at least one EBC layer, at least one TBC layer, at least one CMAS-resistant layer, at least one abradable coating, or combinations thereof.

An EBC layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

In some examples, an EBC layer may include at least one rare earth oxide and alumina, at least one rare earth oxide and silica, or at least one rare earth oxide, silica, and alumina. In some examples, an EBC layer may include an additive in addition to the primary constituents of the EBC layer. For example, an EBC layer may include at least one of $TiO_2$, $Ta_2O_5$, $HfSiO_4$, an alkali metal oxide, or an alkali earth metal oxide. The additive may be added to the EBC layer to modify one or more desired properties of the EBC layer. For example, the additive components may increase or decrease the reaction rate of the EBC layer with CMAS, may modify the viscosity of the reaction product from the reaction of CMAS and the EBC layer, may increase adhesion of the EBC layer to bond coat 22, may increase the chemical stability of the EBC layer, or the like.

In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

In some examples, an EBC layer may include a base material, a first additive, and a second additive. The base material may include, for example, at least one of a glass ceramic, a rare earth disilicate, a rare earth monosilicate, or a rare earth oxide. In some examples, the base material may include BSAS, SAS, or BAS. In other examples, the base material may include yttrium disilicate ($Y_2Si_2O_7$) ytterbium disilicate ($Yb_2Si_2O_7$), yttria, ($Y_2O_3$), ytterbia ($Yb_2O_3$), yttrium monosilicate ($Y_2SiO_5$), or ytterbium monosilicate ($Yb_2SiO_5$). In some examples, the EBC layer may include between about 50 wt. % and about 99 wt. % of the base material, such as between about 60 wt. % and about 95 wt. % of the base material, or between about 70 wt. % and about 90 wt. % of the base material.

The EBC layer also may include a first additive. The first additive may be selected to facilitate bonding of the EBC layer with bond coat 16, which includes silicon metal. In some examples, the first additive includes silicon metal or an alloy including silicon metal. In other examples, the first additive consists essentially of silicon metal, or consists of silicon metal. In some examples, the EBC layer may include between about 0.5 wt. % and about 20 wt. % of the first additive, such as between about 0.5 wt. % and about 10 wt. % of the first additive, or between about 1 wt. % and about 5 wt. % of the first additive. In some examples, the first additive may react with one or more other constituents of the EBC layer. However, EBC layer may include the stated amount of the first additive at the time of formation of the EBC layer.

The EBC layer also may include a second additive. The second additive may facilitate sintering of the EBC layer and formation of a substantially dense EBC layer. For example, the second additive may react with one or more other constituents of EBC layer to form a phase with a relatively low melting temperature (e.g., a melting temperature lower than at least one other phase in the EBC layer). In this way, the phase with the relatively low melting temperature may sinter or flow more readily and may fill porosity in the EBC layer.

In some examples, the second additive may include at least one of a pre-ceramic polymer, such as polysilazane, a rare earth oxide, alumina, silica, titanium oxide, tantalum oxide, boron oxide, an alkali metal oxide, an alkali earth metal oxide, aluminum, or a rare earth metal. In some examples, the EBC layer may include between about 0.5 wt. % and about 30 wt. % of the second additive, such as between about 0.5 wt. % and about 15 wt. % of the second additive, or between about 1 wt. % and about 5 wt. % of the second additive.

Regardless of the composition of the EBC layer, in some examples, the EBC layer may have a dense microstructure, a porous microstructure, a columnar microstructure, or a combination of at least two of dense, porous, or columnar microstructures. A dense microstructure may be more effective in preventing the infiltration of CMAS and other environmental contaminants, while a porous or columnar microstructure may be more strain tolerant during thermal cycling. A combination of dense, porous, and columnar microstructures may be more effective in preventing the infiltration of CMAS or other environmental contaminants than a porous or fully columnar microstructure while being more strain tolerant during thermal cycling than a fully dense microstructure. In some examples, an EBC layer with a dense microstructure may have a porosity of less than about 10 vol. %, such as less than about 8 vol. %, less than 5 vol. %, or less than about 2 vol. %, where porosity is measured as a percentage of pore volume divided by total volume of the EBC layer. In some examples, an EBC layer with a porous microstructure may have a porosity of more than about 10 vol. %, such as more than about 15 vol. %, more than 20 vol. %, or more than about 30 vol. %, where porosity is measured as a percentage of pore volume divided by total volume of the EBC layer.

In some examples, the EBC layer may be formed using a thermal spraying technique or a vapor deposition technique. In other examples, as described in further detail below, the EBC layer may be formed using a slurry deposition technique.

In some examples, protective coating 18 additionally or alternatively may include a TBC layer. The TBC layer may include, for example, yttria-stabilized zirconia (YSZ), zirconia stabilized by a single or multiple rare earth oxides, hafnia stabilized by a single or multiple rare earth oxides, zirconia-rare earth oxide compounds, such as $RE_2Zr_2O_7$ (where RE is a rare earth element), and hafnia-rare earth oxide compounds, such as $RE_2Hf_2O_7$ (where RE is a rare earth element).

In some examples, protective coating 18 additionally or alternatively may include an abradable layer. An abradable layer may include at least one of a rare earth oxide, a rare earth silicate, an aluminosilicate, or an alkaline earth aluminosilicate. For example, an abradable layer may include mullite, BSAS, BAS, SAS, at least one rare earth oxide, at least one rare earth monosilicate, at least one rare earth disilicate, or combinations thereof. In some examples, the abradable layer may include any of the compositions described herein with respect to the EBC layer.

The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled by the use of coating material additives and/or processing techniques to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over substrate 12 to form the abradable layer. The coating material additive then may be melted or burned off in a post-formion heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in the abradable layer.

Figure 2:
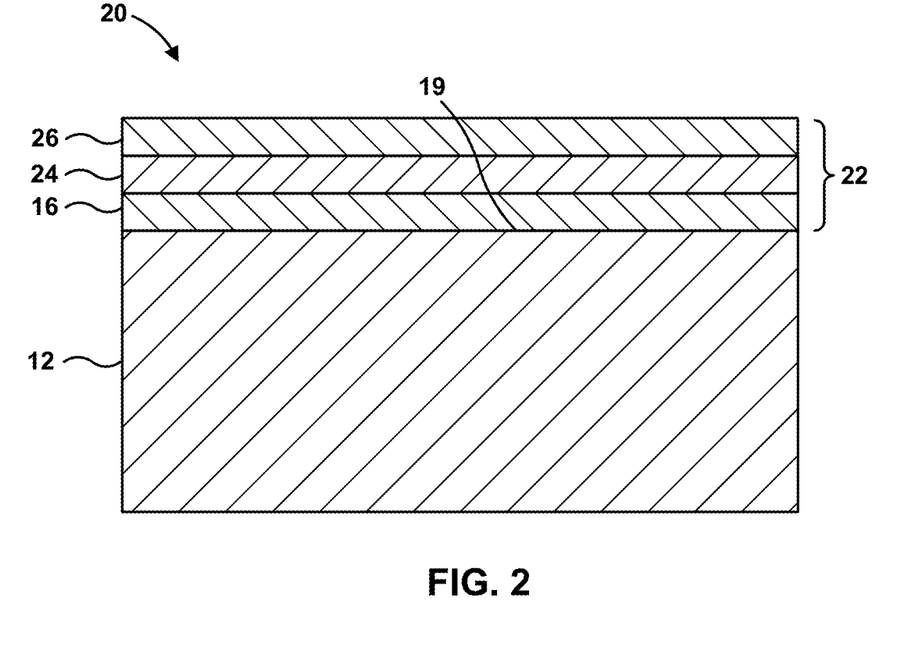
FIG. 2 is a conceptual and schematic diagram illustrating an example article including a substrate and a coating, which includes a bond coat and a plurality of protective coatings.

In some examples, as described above, an article may include multiple protective coatings. For example, FIG. 2 is a conceptual and schematic diagram illustrating an example article 20 including a substrate 12 and a coating 22, which includes a bond coat 16 and a plurality of protective coatings 24 and 26. Substrate 12 and bond coat 16 may be similar to or substantially the same as described above with respect to FIG. 1.

Each of protective coatings 24 and 26 may include an EBC layer, a TBC layer, a CMAS-resistant layer, or an abradable layer. For example, first protective coating 24 may include an EBC layer, and second protective coating 26 may include an abradable layer, a CMAS-resistant layer, or a TBC layer. As another example, first protective coating 24 may include a TBC layer and second protective coating 26 may include an abradable layer, a CMAS-resistant layer, or an EBC layer. Other combinations will be apparent to one of ordinary skill in the art. Moreover, although FIG. 2 illustrates two protective coatings 24 and 26, article 20 may include any number of protective coatings 24 and 26, e.g., at least one protective coating, at least two protective coatings, at least three protective coatings, or the like, and each respective protective coating may be the same or different than another respective protective coating.

In some examples, bond coat 16 may include a surface treatment to increase adherence to the protective coating 18 (FIG. 1) or the adjacent first protective coating 24 (FIG. 2). For example, the outer surface of bond coat 16 may be subjected to a grit blasting technique to increase surface roughness of the outer surface to increase mechanical adherence of protective coating 18 (FIG. 1) or the adjacent first protective coating 24 (FIG. 2). As another example, three-dimensional features may be formed in or on the outer surface of bond coat 16 to increase mechanical adherence of protective coating 18 (FIG. 1) or the adjacent first protective coating 24 (FIG. 2).

Figure 3:
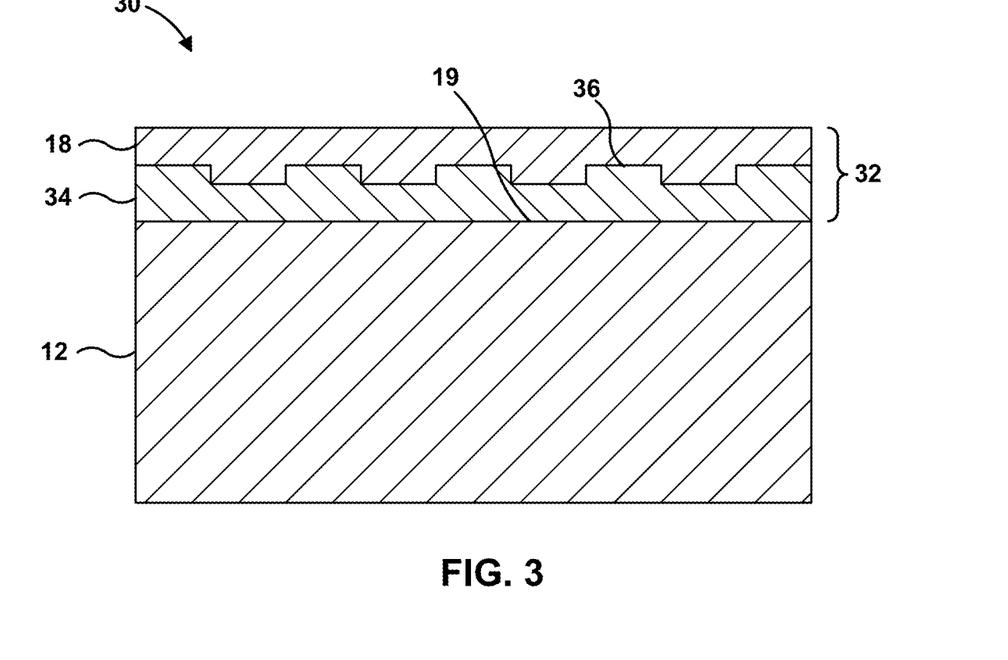
FIG. 3 is a conceptual and schematic diagram illustrating an example article including a substrate and a coating, which includes a bond coat including three-dimensional surface features and a protective coating.

FIG. 3 is a conceptual and schematic diagram illustrating an example article 30 including a substrate 12 and a coating 32, which includes a bond coat 34 including three-dimensional surface features 36 and a protective coating 18. Substrate 12, protective coating 18, and the composition of bond coat 34 may be similar to or substantially the same as described above with respect to FIG. 1.

Three-dimensional surface features 36 disrupt the relative planarity of the surface of bond coat 34, e.g., each of surface features 36 may form a discontinuity in the surface of bond coat 34. Three-dimensional surface features 36 may impede crack growth in bond coat 34, protective coating 18, or both, in a plane parallel to the surface of substrate 12. While not wishing to be bound by any particular theory, three-dimensional surface features 36 may result in an interface between bond coat 34 and protective coating 18 across which a crack would need to propagate to grow from a portion of bond coat 34 to a portion of protective coating 18 or vice versa. The transition between dissimilar materials, e.g., bond coat 34 and protective coating 18, may impede crack growth across the interface of the two materials, and may contain crack growth to a single domain, e.g., a portion of protective coating 18 located in lower portion of three-dimensional surface features 36. Accordingly, even if a crack grows to the extent that a portion of protective coating 18 delaminates from bond coat 34, the portion of protective coating 18 that delaminates may be limited to a smaller portion compared to if bond coat 34 does not include three-dimensional surface features 36.

Three-dimensional surface features 36 may include, for example, depressions, protrusions, grooves, or ridges. The three-dimensional features may define continuous or discontinuous (e.g., discrete) features in bond coat 34. For example, the three-dimensional surface features 36 may define a grid that defines discrete plateaus. In some examples, the grid may include grooves and the plateaus may include protrusions. In other examples, the grid may include ridges and the plateaus may include depressions. In other words, the grid may be raised relative to the plateaus or the plateaus may be raised relative to the grid.

Three-dimensional surface features 36 may include a cross-sectional shape, and each surface feature of three-dimensional surface features 36 may include the same cross-sectional shape, or at least one three-dimensional surface feature may include a different cross-sectional shape. For example, as shown in FIG. 3, three-dimensional surface features 16 may include a rectangular cross-section (either protruding or recessed). As other examples, a three-dimensional surface feature may include a generally arcuate cross-section, such as a half-circle or another, lesser, portion of a circle; a generally triangular cross-section; a generally trapezoidal cross-section; a truncated arcuate cross-section; or a rounded arcuate cross-section. Such cross-sectional profiles are merely examples; other cross-sectional profiles are also possible and will be apparent to those of ordinary skill in the art.

In some examples, the depth or height of at least one of three-dimensional surface features 36 may be less than about 1.27 millimeters (less than about 50 mils), or less than about 0.508 millimeters (less than about 20 mils), or less than about 0.254 millimeters (less than about 10 mils). The depth or height of each of three-dimensional surface features 36 may substantially similar, may increase or decrease monotonically, may increase and then decrease, or may decrease and then increase.

In some examples, each of three-dimensional surface features 36 may be approximately the same width. In other examples, one or more three-dimensional surface features 36 may be a different width than others of three-dimensional surface features 36. In some examples, a width of at least one of three-dimensional surface features 36 may be less than about 6.35 millimeters (about 0.25 inch), or may be less than about 2.54 millimeters (about 0.1 inch).

Adjacent features of three-dimensional surface features 16 may be spaced approximately evenly apart, or may be spaced different distances apart. The distance between adjacent surface features of three-dimensional surface features 16 may be referred to as pitch, and in some examples, may be less than about 6.35 millimeters (about 0.25 inch). In some examples, the pitch may increase or decrease monotonically. In other examples, the pitch may increase and then decrease or may decrease and then increase. In yet other examples, as illustrated in FIG. 2, the pitch may be approximately constant.

In some examples, three-dimensional surface features 16 may be on substantially all of at least one surface of substrate 12. In other examples, three-dimensional surface features 16 may be on a part of at least one surface of substrate 12. For example, only a portion of a surface of substrate 12 may be a surface exposed to environmental conditions that could damage substrate 12, and thus only a portion of a surface of substrate 12 may be coated with protective coating 18. The portion of the surface of substrate 12 covered with protective coating 18 may include three-dimensional surface features 16 to improve adhesion between protective coating 18 and substrate 12.

In some examples, at least bond coat 16 or 34 (collectively, "bond coat 16") may be formed using a slurry deposition technique and localized heating of a precursor layer of bond coat 16 to form bond coat 16. By using slurry deposition and localized heating, heating of substrate 12 may be reduced compared to using a vapor deposition technique, a thermal spraying technique, or a bulk heating step. Reduction of heating of substrate 12 may reduce a chance that substrate 12 is damaged due to exposure to high temperatures, may reduce a manufacturing time of an article including bond coat 16, may reduce a cost of forming bond coat 16, or any combination of these benefits.

Figure 4:
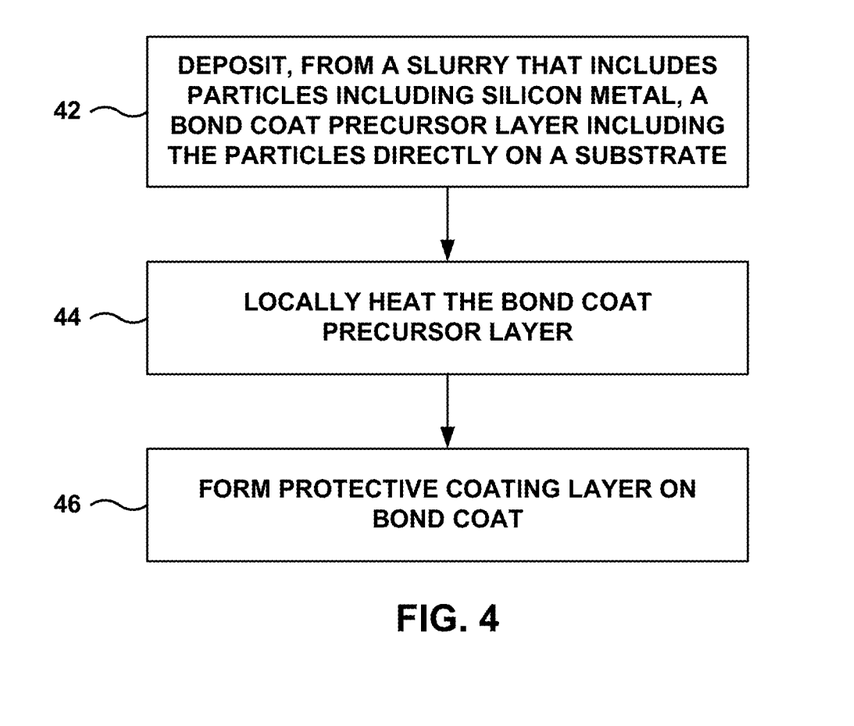
FIG. 4 is a flow diagram illustrating an example technique for depositing a bond coat including silicon metal from a slurry.

FIG. 4 is a flow diagram illustrating an example technique for depositing a bond coat including silicon metal from a slurry. The technique of FIG. 4 will be described with concurrent reference to article 10 of FIG. 1, although the technique of FIG. 4 may be used to form different articles (e.g., article 20 of FIG. 2 or article 30 of FIG. 3), and article 10 of FIG. 1 may be formed using a different technique.

The technique of FIG. 4 includes depositing, from a slurry that includes particles including silicon metal, a bond coat precursor layer including the particles directly on a substrate 12 (42). In general, the slurry may include particles including silicon metal and a solvent. The solvent may include, for example, water; an alcohol, such as ethanol or isopropyl alcohol; methyl ethyl ketone; toluene; or the like.

The particles including silicon metal may include silicon metal or a silicon alloy. In some examples, the particles including silicon metal include high purity silicon, defined herein as including less than about 5 wt. % impurities, such as Al, Fe, Ca, or the like.

In some examples, the slurry may optionally include at least one additive. The optional at least one additive may include, for example, at least one of SiC, a melting point depressant, or an oxidation enhancer, as described above. In some examples, the optional at least one additive may be mixed with the silicon metal within the particles including the silicon metal. In other examples, the at least one additive may be in separate particles that are mixed with the particles including silicon metal. In some examples, the solids in the slurry may include greater than 0 wt. % and less than about 30 wt. % of the optional at least one additive in sum, such as greater than 0 wt. % and less than about 10 wt. % of the optional at least one additive in sum. In other examples, the solids in the slurry may include greater than 0 wt. % and less than about 30 wt. % of the optional each optional additive that is present in the slurry, greater than 0 wt. % and less than about 10 wt. % of the optional each optional additive that is present in the slurry.

The size of the particles including silicon metal may affect the melting rate of the bond coat precursor layer during subsequent heating of the bond coat precursor layer. For example, finer particles may melt more quickly at a given temperature or temperature ramp rate. In some examples, to facilitate melting of the particles, the particles including silicon metal may include an average diameter less than about 100 micrometers, or less than about 50 micrometers.

In some examples, the slurry optionally may include at least one of a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like.

The slurry may be applied to surface 19 of substrate 12 using any one of a variety of slurry deposition techniques. For example, the slurry may be applied to surface 19 of substrate 12 using dip coating, spray coating, spin coating, brushing, or the like. As another example, the slurry then may be formed into a layer (a tape) on a liner and at least partially dried to remove at least some of the solvent. The resulting tape includes the silicon metal and any optional additives, and may be applied to substrate 12 to deposit the bond coat precursor layer including the particles including silicon metal on substrate 12 (42).

The technique of FIG. 4 also may include locally heating the bond coat precursor layer to form bond coat 16 (44). In some examples, the local heating may be accomplished using a laser to a TIG welding energy source. By locally heating the bond coat precursor layer, the amount of heat transferred to substrate 12 may be reduced, e.g., compared to a heating technique that heats substrate 12 and the bond coat precursor layer to a substantially uniform temperature. This may reduce a likelihood that the heating or thermal cycling of substrate 12 may damage substrate 12. Additionally or alternatively, this may allow the bond coat precursor layer to be heated to a higher temperature that is substrate 12 was heated to the same temperature as the bond coat precursor layer. By allowing heating of the bond coat precursor layer to a higher temperature, local heating of the bond coat precursor layer may allow access to a wider range of compositions for bond coat 16, e.g., compositions that melt at a higher temperature that would be detrimental to substrate 12 if substrate 12 were to be heated to the higher temperature.

Additionally or alternatively, if the slurry includes a melting point depressant additive, the melting point of at least one constituent of the bond coat precursor layer may be lowered, which may further reduce heat transferred to substrate 12 during the local heating of the bond coat precursor layer.

In some examples, the localized heating of the bond coat precursor layer may be performed in an inert atmosphere (e.g., an atmosphere that includes chemical species that do not react with constituents of substrate 12 or the bond coat precursor layer at the temperature and pressure of the localized heating technique). In other examples, the localized heating of the bond coat precursor layer may be performed in a vacuum. In still other examples, the localized heating of the bond coat precursor layer may be performed in a reducing atmosphere. The localized heating may be performed for up to about 30 minutes.

The localized heating may sinter or melt at least the particles including silicon metal to form bond coat 16. In some examples, bond coat 16 may be substantially non-porous (e.g., a porosity of less than about 5 vol. % or less than 1 vol. %) after locally heating the bond coat precursor layer to form bond coat 16 (44).

The technique of FIG. 4 may additionally include forming protective coating 18 on bond coat 16 (46). As described above, protective coating 18 may include, for example, an EBC layer, CMAS-resistant layer, TBC layer, abradable layer, or the like. Protective coating 18 may be formed using, for example, a thermal spraying technique, such as plasma spraying; CVD, PVD, electron beam PVD (EB-PVD), directed vapor deposition (DVD), a slurry-based coating technique, or the like.

Figure 5:
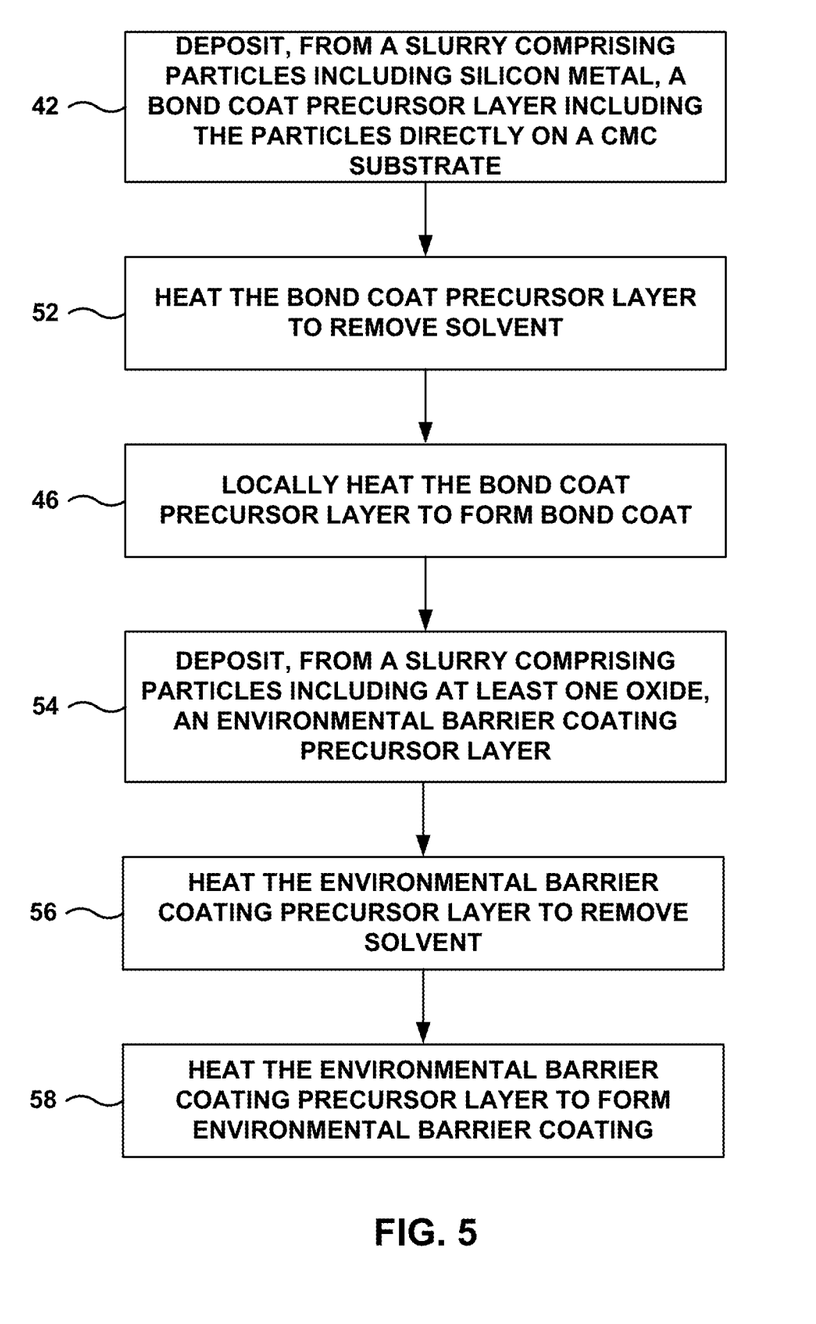
FIG. 5 is a flow diagram illustrating an example technique for depositing a bond coat including silicon metal from a slurry and depositing an environmental barrier coating from a slurry.

FIG. 5 is a flow diagram illustrating an example technique for depositing a bond coat including silicon metal from a slurry and depositing an environmental barrier coating from a slurry. The technique of FIG. 5 will be described with concurrent reference to article 10 of FIG. 1, although the technique of FIG. 5 may be used to form different articles (e.g., article 20 of FIG. 2 or article 30 of FIG. 3), and article 10 of FIG. 1 may be formed using a different technique.

The technique of FIG. 5 includes depositing, from a slurry that includes particles including silicon metal, a bond coat precursor layer including the particles directly on a substrate 12 (42). This step of FIG. 5 may be similar to or substantially the same as step (42) described above with respect to FIG. 4.

The technique of FIG. 5 also optionally includes heating the bond coat precursor layer to remove the solvent from the slurry (52). In some examples, the bond coat precursor layer may be heated at a temperature of between about 80° C. and about 150° C. for up to about 2 hours to remove substantially all (e.g., all or nearly all) of the solvent from the slurry.

Once the bond coat precursor layer has been heated to remove the solvent from the slurry (52), the technique of FIG. 5 includes locally heating the bond coat precursor layer to form bond coat 16 (44). This step of FIG. 5 may be similar to or substantially the same as step (44) described above with respect to FIG. 4.

In the technique of FIG. 5, protective coating 18 includes and EBC layer, which is deposited using a slurry coating technique. First, an EBC precursor layer is deposited from a slurry that includes particles including at least one oxide (54). As described above, the EBC layer may include any one of a variety of compositions, and the at least one oxide in the slurry may depend on the composition of the EBC layer. For example, the EBC layer may include at least one of a rare earth oxide, a rare earth silicate, an aluminosilicate, or an alkaline earth aluminosilicate. For example, the EBC layer may include mullite, BSAS, BAS, SAS, at least one rare earth oxide, at least one rare earth monosilicate, at least one rare earth disilicate, or combinations thereof. As other examples, the EBC layer may include at least one rare earth oxide and alumina, at least one rare earth oxide and silica, or at least one rare earth oxide, silica, and alumina. In some examples, the EBC layer may be substantially free (e.g., free or nearly free) of hafnia and/or zirconia.

In some examples, an EBC layer may include a base material, a first additive, and a second additive. The base material may include, for example, at least one of a glass ceramic, a rare earth disilicate, a rare earth monosilicate, or a rare earth oxide. The first additive includes silicon metal or an alloy including silicon metal. The second additive may include at least one of a pre-ceramic polymer, such as polysilazane, a rare earth oxide, alumina, silica, titanium oxide, tantalum oxide, boron oxide, an alkali metal oxide, an alkali earth metal oxide, aluminum, or a rare earth metal.

The slurry including the at least one oxide also includes a solvent. The solvent may include, for example, water; an alcohol, such as ethanol or isopropyl alcohol; methyl ethyl ketone; toluene; or the like.

In some examples, the slurry additionally may include at least one of a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like.

In some examples, the technique of FIG. 5 also includes heating the EBC precursor layer to substantially remove the solvent (56). In some examples, the EBC precursor layer may be heated at a temperature of between about 80° C. and about 300° C. for up to about 2 hours to remove substantially all (e.g., all or nearly all) of the solvent from the slurry.

Once substantially all of the solvent has been removed, the technique of FIG. 5 also may include heating the EBC precursor layer to form the EBC layer (58). In some examples, the heating of the EBC precursor layer may include local heating of the EBC precursor layer, e.g., using a laser or a TIG welding energy source. In other examples, the local heating of the EBC precursor layer may include heating article 10 in a furnace. In some examples, the EBC precursor layer may be heated to a temperature up to about 1500° C., such as up to about 1414° C., or between about 1000° C. and about 1400° C. In some examples, heating the EBC precursor layer to form the EBC layer may (1) cause sintering of the base material, (2) cause reaction between the at least some of the second additive and at least some of the base material, (3) melt the first additive, which facilitates bonding of the EBC layer to bond coat 16, or (4) any combination of (1), (2), and (3). As described above, reaction of the second additive with the base material may form phase with a relatively low melting point, which may facilitate formation of dense EBC layer by at least partially filling cracks or porosity in the EBC layer.

In other examples, instead of locally heating the bond coat precursor layer to form bond coat 16 (44) and separately heating the EBC precursor layer to form the EBC layer (58), the EBC precursor layer may be deposited from a slurry that includes particles including at least one oxide (54) onto the dried bond coat precursor layer, the EBC precursor layer may be heated to substantially remove the solvent (56), and a single heating step may be performed to form bond coat 16 and the EBC layer.

In some examples, rather than the EBC layer being applied in a single layer, the EBC layer may be applied in multiple, thinner layers. Each thinner layer may be heated to substantially remove the solvent in the thinner layer before depositing the subsequent layer from a slurry. Then, once all the thinner layers have been deposited, the resulting EBC precursor layer structure may be heated to form the EBC layer (58).

EXAMPLE

Figure 6:
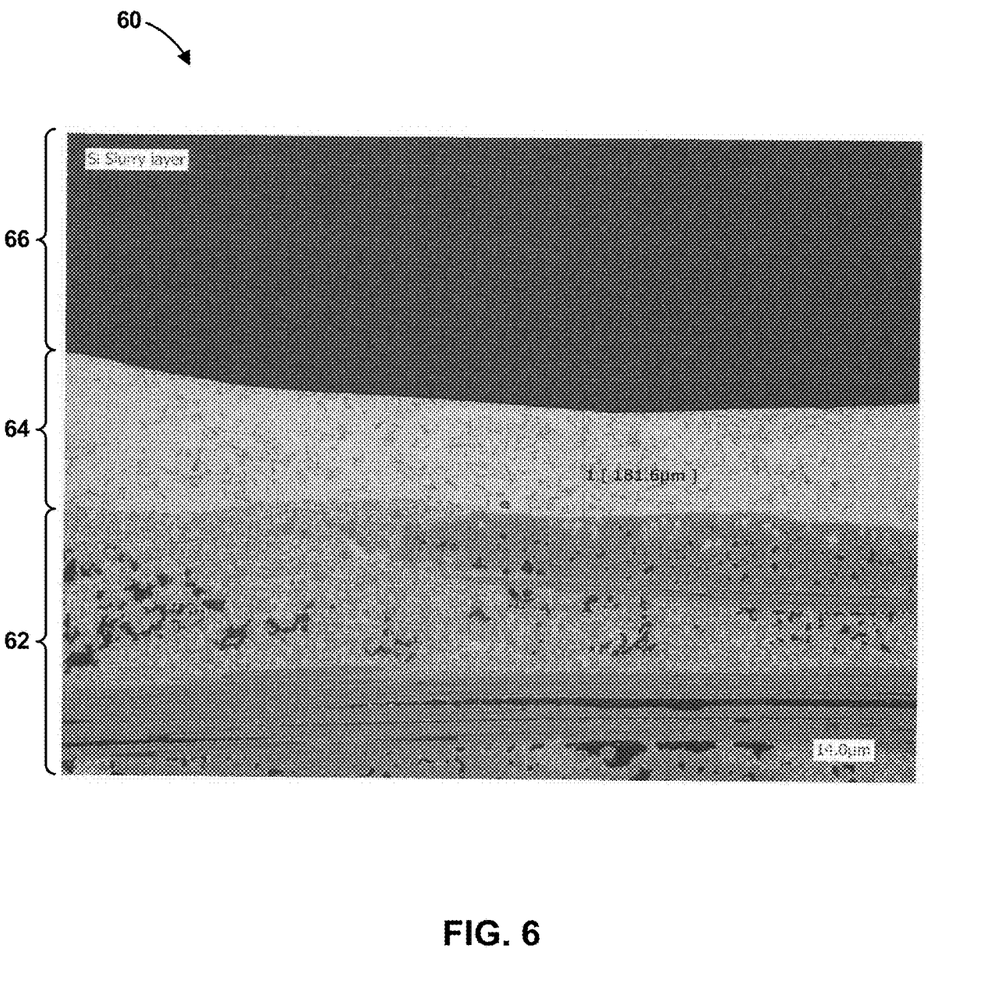
FIG. 6 is a metallographic section illustrating an example ceramic matrix composite substrate coated with a silicon bond coat that was deposited from a slurry.

FIG. 6 is a metallographic section illustrating an example article 60 that includes CMC substrate 62 coated with a silicon bond coat 64 that was deposited from a slurry. CMC substrate 62 included an SiC—SiC composite. To form silicon bond coat 64, 325 mesh 99.9% purity Si powder was mixed in ethanol and stirred for 10 minutes. A 0.5"×2" coupon of CMC substrate 62 dip coated with the Si slurry. The coated coupon was dried at about 80° C. for about 1 hour. Silicon bond coat 64 on the CMC coupon was locally melted by a TIG welder beam. After TIG welding, the coated surface was grit blasted with 280 grit. During the technique, some elements from CMC substrate 62 diffused into silicon bond coat 64 and formed the secondary needle-like phases shown in silicon bond coat 64. The structure labeled 66 in FIG. 6 is an epoxy mount used to facilitate handling of article 60.

Various examples have been described. These and other examples are within the scope of the following claims.

The invention claimed is:

1. An article comprising:
   a ceramic matrix composite substrate;
   a bond coat directly on the substrate, wherein the bond coat comprises SiC particles and a silicon alloy, wherein the silicon alloy comprises silicon metal and more than 0 wt. % and less than about 30 wt. % of at least one of zirconium metal, yttrium metal, titanium metal, aluminum metal, chromium metal, niobium metal, tantalum metal, or a rare earth metal; and
   a protective coating on the bond coat.

2. The article of claim 1, wherein the bond coat comprises greater than 0 wt. % and less than about 10 wt. % of the at least one of zirconium metal, yttrium metal, titanium metal, aluminum metal, chromium metal, niobium metal, tantalum metal, or the rare earth metal.

3. The article of claim 1, wherein the silicon alloy comprises the silicon metal and more than 0 wt. % and less than about 30 wt. % of each of at least two of zirconium metal, yttrium metal, titanium metal, aluminum metal, chromium metal, niobium metal, tantalum metal, or a rare earth metal.

4. The article of claim 1, wherein the at least one of zirconium metal, yttrium metal, titanium metal, aluminum metal, chromium metal, niobium metal, tantalum metal, or the rare earth metal is configured to reduce a melting temperature of the bond coat.

5. The article of claim 1, wherein the bond coat further comprises an oxidation enhancement additive, wherein the oxidation enhancement additive comprises at least one of molybdenum metal, hafnium metal, or ytterbium metal.

6. The article of claim 5, wherein the bond coat comprises greater than 0 wt. % and less than about 10 wt. % of the oxidation enhancement additive.

7. The article of claim 5, further comprising an oxide scale between the bond coat and the protective coating.

8. The article of claim 1, wherein the ceramic matrix composite substrate is at least one of a blade track, an airfoil, a blade, vane, or a combustion chamber liner.

9. The article of claim 1, wherein the bond coat comprises between about 1 vol. % and about 40 vol. % SiC particles.

10. The article of claim 9, wherein the bond coat comprises between about 5 vol. % and about 20 vol. % SiC particles.

11. The article of claim 1, wherein the protective coating comprises an environmental barrier coating.

12. The article of claim 11, wherein the environmental barrier coating comprises:
   a base material comprising at least one of a glass ceramic, a rare earth disilicate, a rare earth monosilicate, or a first rare earth oxide;
   a first additive comprising silicon metal; and
   a second additive comprising at least one of a pre-ceramic polymer, a second rare earth oxide, alumina, silica, titanium oxide, tantalum oxide, boron oxide, an alkali metal oxide, an alkali earth metal oxide, aluminum metal, or a rare earth metal.

13. The article of claim 12, wherein the second additive is configured to react with another constituent of the environmental barrier coating to form at least one phase that has a lower melting point compared to a main phase of the environmental barrier coating.

14. The article of claim 1, wherein the ceramic matrix composite substrate comprises a melt-infiltrated SiC—SiC ceramic matrix composite.

15. The article of claim 1, wherein the protective coating comprises at least one of a thermal barrier coating, an abradable coating, or a calcia-magnesia-aluminosilicate-resistant layer.

16. The article of claim 1, wherein the bond coat comprises a plurality of three-dimensional surface features defined in an outer surface of the bond coat.

17. The article of claim 1, wherein the bond coat is deposited on the ceramic matrix composite substrate using a slurry.

* * * * *